US012562766B2

(12) United States Patent
Hauseder

(10) Patent No.: US 12,562,766 B2
(45) Date of Patent: Feb. 24, 2026

(54) RECEIVER TO PROCESS A LOAD MODULATED ANALOG INPUT SIGNAL

(71) Applicant: Renesas Design Austria GmbH, Graz (AT)

(72) Inventor: Gregor Hauseder, Graz (AT)

(73) Assignee: Renesas Design Austria GmbH, Graz (AT)

( * ) Notice: Subject to any disclaimer, the term of this patent is extended or adjusted under 35 U.S.C. 154(b) by 0 days.

(21) Appl. No.: 18/995,084

(22) PCT Filed: May 16, 2023

(86) PCT No.: PCT/EP2023/063064
§ 371 (c)(1),
(2) Date: Jan. 15, 2025

(87) PCT Pub. No.: WO2024/012747
PCT Pub. Date: Jan. 18, 2024

(65) Prior Publication Data
US 2025/0260431 A1     Aug. 14, 2025

(30) Foreign Application Priority Data

Jul. 15, 2022     (EP) .................................... 22185113

(51) Int. Cl.
*H04B 1/16*          (2006.01)
*H04B 1/18*          (2006.01)
(52) U.S. Cl.
CPC ............. *H04B 1/1607* (2013.01); *H04B 1/18* (2013.01)
(58) Field of Classification Search
CPC .......... H04B 1/06; H04B 1/16; H04B 1/1607; H04B 1/18; H04B 1/30; G06K 5/00;
(Continued)

(56) References Cited

U.S. PATENT DOCUMENTS

| | | | | |
|---|---|---|---|---|
| 7,890,080 B2 * | 2/2011 | Wu | ...................... | G06K 7/0008 |
| | | | | 340/572.1 |
| 8,207,825 B2 * | 6/2012 | Rofougaran | ............. | H04B 5/22 |
| | | | | 340/572.4 |

(Continued)

FOREIGN PATENT DOCUMENTS

EP          3168772 A1     5/2017

OTHER PUBLICATIONS

International Search Report and Written Opinion dated Apr. 9, 2023 issued in PCT/EP2023/063064.

*Primary Examiner* — Quochien B Vuong
(74) *Attorney, Agent, or Firm* — SCULLY, SCOTT, MURPHY & PRESSER, P.C.

(57)          ABSTRACT

A receiver (36; 43) that is built to receive a load modulated analog input signal (3) and built to output digital data (4) detected in the input signal (3), which receiver (36; 43) comprises: either a first in-phase correlator (38) and a second in-phase correlator (40) or a first quadrature-phase correlator (45) and a second quadrature-phase correlator (46),
  which first in-phase correlator (38) comprises:
    a first in-phase subcarrier mixer (23-1) and a first subtraction stage (39) built to subtract an output signal (28-2) of the second quadrature-phase subcarrier mixer (23-4) from an output signal (27-1) of the first in-phase subcarrier mixer (23-1) and
    an integrator (26) built to continuously integrate an output signal of the first subtraction stage (39) over time during an integration window to provide the output signal of the first in-phase correlator (38);
  which second in-phase correlator (40) comprises:
    a second in-phase subcarrier mixer (23-2) and an first addition stage (41) built to add an output signal (27-2) of the second in-phase subcarrier mixer (23-2)
(Continued)

with an output signal (28-1) of the first quadrature-phase subcarrier mixer (23-3) and an integrator (26) built to continuously integrate an output signal of the first addition stage (41) over time during an integration window to provide the output signal of the second in-phase correlator (40).

8 Claims, 4 Drawing Sheets

(58) Field of Classification Search
CPC .. G06K 5/40; G06K 5/48; G06K 7/00; G06K 7/008; H03K 7/00; H03K 9/00; H03K 9/06; H04L 27/22
See application file for complete search history.

(56) References Cited

U.S. PATENT DOCUMENTS 9,256,771 B2 * 2/2016 Bae ..................... G06K 7/10138
10,148,475 B1 * 12/2018 Jongsma .................. H04B 1/30

* cited by examiner

STATE OF THE ART

RECEIVER TO PROCESS A LOAD MODULATED ANALOG INPUT SIGNAL

FIELD OF THE INVENTION

The present invention relates to a receiver that receives a load modulated analog input signal and outputs digital data detected in the input signal, which receiver comprises: an in-phase carrier mixer that mixes the input signal with an in-phase carrier frequency signal and provides an in-phase component of the down-converted input signal and a quadrature-phase carrier mixer that mixes the input signal with a quadrature-phase carrier frequency signal and provides a quadrature-phase component of the down-converted input signal; an amplifier to amplify the in-phase component and the quadrature-phase component of the down-converted input signal;
a DC block filter to remove the DC component of the in-phase component and the quadrature-phase component.

BACKGROUND OF THE INVENTION

Document EP 3 168 772 B discloses such a receiver that is used for radio frequency identification (RFID) devices like RFID readers to communicate with active or passive transponders. In a typical application a passive transponder or tag stores product identification of a product to which it is attached and the reader is used to obtain this product information. The reader is powered and generates a magnetic field from its antenna. When the reader and the tag are within close proximity of each other, the reader generated magnetic field is induced into the antenna of the tag and used to power the tag. The tag also has a transceiver to receive the signal from the reader and to transmit a response back to the reader.

There are standards like ISO/IEC18000-3 or ISO/IEC 14.443 Type A and B or ISO15.693 or ECMA-340 13.56 MHz Near Field Communication (NFC) or company standards like Felica from company Sony that define protocols and types of modulation used to transmit information between the tag and the reader. Some or all of these standards define that the reader transmits data to the tags by changing the magnitude of its transmitted power. Tags receive the transmitted signal and process the received data. The activated tag then replies by transmitting data to the reader. A typical technique is to use load modulation, in which the tag varies the load impedance of its coil by changing its resonance frequency and its quality factor. This action causes a voltage variation at the reader antenna. The receiver of the reader disclosed in document EP 3 168 772 B and shown in FIG. 1 of this patent application processes such load modulated analog input signals to output digital data detected in the input signal.

FIG. 1 shows this known receiver 1 that is part of an RFID reader 2 that is built to receive a load modulated analog input signal 3 and outputs digital data 4 sent from a transponder or tag to the reader 2 and detected in the input signal 3. Reader 2 according to the embodiment disclosed communicates with the tag according to the ECMA-340 13,56 MHZ Near Field Communication NFC standard, which NFC Standard in-cooperates communication based on ISO/IEC 14.443 Type A and B and Felica, a company standard from company Sony. Reader 2 furthermore comprises a transmitter, not shown in the figures, to emit a magnetic field via antenna A and to transmit data to one or more tags. Such a tag is for instance disclosed in document U.S. Pat. No. 7,890,080 B2.

When the reader 2 and the tag are within close proximity of each other, the reader 2 generated magnetic field is induced into the antenna of the tag and used to power the tag. The tag also has a transceiver to receive the signal from reader 2 and to transmit a load modulated response back to reader 2, which reader 2 receives the response from the tag as the load modulated analog input signal 3. Reader 2 comprises an in-phase carrier mixer 5 that mixes the input signal 3 with an in-phase component 6 of a 13.56 MHz carrier frequency signal and provides an input in-phase component 7 of the down-converted input signal. Reader 2 furthermore comprises a quadrature-phase carrier mixer 8 that mixes the input signal 3 with a quadrature-phase carrier frequency signal 9 of the 13.56 MHz carrier frequency signal and provides a input quadrature-phase component 10 of the down-converted input signal.

Receiver 1 furthermore comprises filter 11 and 12 to filter unwanted mixing products from the input in-phase component 7 and the input quadrature-phase component 10 of the load modulated analog input signal 3. Such unwanted mixing products are in particular at 0 Hz as well as at 2*13.56 MHz.

Receiver 1 furthermore comprises amplifier 13 and 14 built to amplify the filtered input in-phase component and the filtered input quadrature-phase component of the down-converted input signal. As the typical modulation of the antenna signal is very small, a substantially gain is necessary before further processing of the input in-phase component 7 and input quadrature-phase component 10.

Receiver 1 furthermore comprises DC block filter 15 and 16 built to remove the DC component of the amplified input in-phase component and the amplified input quadrature-phase component. Such DC component in particular is added by amplifiers 13 and 14 and needs to be removed before further processing of an in-phase component 24 and quadrature-phase component 25.

Receiver 1 furthermore comprises a first in-phase correlators 17 and a second in-phase correlator 18 and a first quadrature-phase correlator 19 and a second quadrature-phase correlator 20 to correlate the in-phase component 24 and the quadrature-phase component 25 with an in-phase component 21 and a quadrature-phase component 22 of a subcarrier or code clock frequency of the load modulated analog input signal 3. In an initial phase of the communication, based on the NFC Standard, the receiver 1 detects which protocol of which standard is used by the tag close by to reader 2. If at that stage it is decided that reader 2 and the tag will communicate based on ISO14.443 Type A or B, a square wave that represents the subcarrier frequency of 848 kHz is used and, if at that that stage it is decided that reader 2 and tag will communicate based on Felica a square wave, that represents the Manchester clock frequency of 212 kHz or 424 kHz, is used.

Each of the in-phase correlators 17 and 18 and quadrature-phase correlators 19 and 20 comprises a subcarrier mixer 23-1 to 23-4 to mix the in-phase component 24 and the quadrature-phase component 25 from the DC block filters 15 and 16 with the in-phase component 21 and the quadrature-phase component 22 of the subcarrier or code clock frequency. A first in-phase subcarrier mixer 23-1 is built to mix the in-phase component 24 with the in-phase component 21 of the subcarrier with a frequency of 848 kHz. A second in-phase subcarrier mixer 23-2 is built to mix the in-phase component 24 with the quadrature-phase component 22 of the subcarrier with a frequency of 848 kHz. A first quadrature-phase subcarrier mixer 23-3 is built to mix the quadrature-phase component 25 with the in-phase component 21 of the subcarrier with a frequency of 848 kHz. A second quadrature-phase subcarrier mixer 23-4 is built to mix the quadrature-phase component 25 with the quadrature-phase component 22 of the subcarrier with a frequency of 848 KHz.

Each of the in-phase correlators 17 and 18 and the quadrature-phase correlators 19 and 20 furthermore comprises an integrator 26 to continuously integrate the in-phase components 27-1 and 27-2 and the quadrature-phase components 28-1 and 28-2 from the subcarrier mixers 23-1 to 23-4 over time during an integration window. The integration window is fixed for the different modulation types as follows:

ISO14.443 Type A to four sub-carrier periods;
ISO14.443 Type B to eight sub-carrier periods for a data rate of 106 kbit/s;
ISO14.443 Type B to four sub-carrier periods for a data rate of 212 kbit/s;
ISO14.443 Type B to two sub-carrier periods for a data rate of 424 kbit/s;
ISO14.443 Type B to one sub-carrier periods for a data rate of 848 kbit/s;
Felica to one sub-carrier period.

This means that for instance for ISO14.443 Type A integrator 26 integrates the output of the subcarrier mixers 23-1 to 23-4 for the integration window or time period of four sub-carrier periods what results in 4.2 µs.

Receiver 1 furthermore comprises a combiner 29 to combine four output signals 30, 31, 32 and 33 of the two in-phase correlators 17 and 18 and the two quadrature-phase correlators 19 and 20. Combiner 29 according to one embodiment disclosed in EP 3 168 772 B is built to add all four output signals 30, 31, 32 and 33 of the two in-phase correlators 17 and 18 and the two quadrature-phase correlators 19 and 20 into an output signal 34 of the combiner 29. This is a technical simple and robust solution to use as much power and information about the load modulated analog input signal 3 available in the four output signals 30, 31, 32 and 33.

Receiver 1 furthermore comprises a slicer 35 built to sample the output signal 34 of combiner 29 at maximum energy levels to output digital data 4 detected in the load modulated analog input signal 3. Sampling could be done just at maximum energy levels of output signal 34 of the combiner 29, if all four output signals 30, 31, 32 and 33 are added in the combiner 29 into output signal 34. In another state of the art embodiment disclosed only one or more of the output signals 30, 31, 32 and 33 are selected in the combiner 29 and this information from the combiner 29 is used in the slicer 35 to select the appropriate aligned bit-clock. If for instance combiner 29 selects the two output signals 30 and 31 of the two in-phase correlators 17 and 18 as these two output signals comprise a higher energy level as the two quadrature-phase correlators 19 and 20, then slicer 35 selects the in-phase bit-clock to generate the samples and detect digital data 4 in output signal 34. This has the advantage that the sampling point is already close to the optimum and only requires little further adjustment.

Drawback for this receiver disclosed in document EP 3 168 772 B is that the four integrators 26 occupy a large area on the chip and post processing of all four output signals 30, 31, 32 and 33 consumes much energy which is always limited.

SUMMARY OF THE INVENTION

It is an object of the invention to provide a receiver that needs less chip area and consumes less energy, while improving the quality of the digital data provided.

This object is achieved with a receiver that comprises all elements claimed in claim 1.

The invention is based on the finding that the four subcarrier mixers of receiver 1 shown in FIG. 1 may be interpreted as a multiplication of two complex-valued numbers:

$$(I_{in} + iQ_{in}) * (I_{SC} + iQ_{SC})$$

Receiver 1 fulfills the following equation with the four subcarrier mixers 23-1 to 23-4:

$$I_{in} I_{SC} + i Q_{in} I_{SC} + i I_{in} Q_{SC} - Q_{in} Q_{SC}$$

wherein $I_{in}$ is the in-phase component 24 and $I_{SC}$ is the in-phase component 21 of the subcarrier and $Q_{in}$ is the quadrature-phase component 25 and $Q_{SC}$ is the quadrature-phase component 22 of the subcarrier. Above equation may be transformed into below equation that provides a complex-valued number with a real term and an imaginary term as the result of the multiplication:

$$(I_{in} I_{SC} - Q_{in} Q_{SC}) + i(Q_{in} I_{SC} + I_{in} Q_{SC})$$

As a result of above findings only two of the four integrators are needed, if the output signals of sub-carrier mixers without integrator are added or subtracted from the output signals of the other sub-carrier mixers as claimed in claim 1. This enables two different inventive embodiments that are shown in FIGS. 2 and 5.

Both of these inventive embodiments comprise the advantage that only two integrators compared to the four integrators of the state of the art reduce the complexity and consume less chip area. As only two output signals of the correlates have to be processed in the combiner and slicer, complexity and power consumption is reduced. Quality of the digital data is improved as the amplitude of the only two output signals of the correlators is higher compared to the amplitude of the four output signals of the correlators. The reason for the increase in amplitude is that the four correlator output signals are combined to two. Specifically, output signal 28-2 is subtracted from output signal 27-1, and output signal 28-1 is added to output signal 27-2. The exact increase in amplitude depends on the phase relation between the input signal 3 and the in-phase component 6 and the quadrature-phase component 9 of the 13.56 MHz clock synchronized to the 13.56 MHz carrier frequency signal, as well as on the phase relation between the in-phase component 24 and the quadrature-phase component 25 and the in-phase component 21 and the quadrature-phase component 22 of the code clock frequency. In the worst case, no improvement is achieved, for example if output signal 27-1 and output signal 28-1 contain all the signal energy. In the typical case however, the signal energy is spread across all four output signals 27-1, 27-2, 28-1 and 28-2 of the sub-carrier mixers 23-1 to 23-4. These and other aspects of the invention will be apparent from and elucidated with reference to the embodiments described hereinafter. The person skilled in the art will understand that various embodiments may be combined.

DETAILED DESCRIPTION OF EMBODIMENTS

Figure 2:
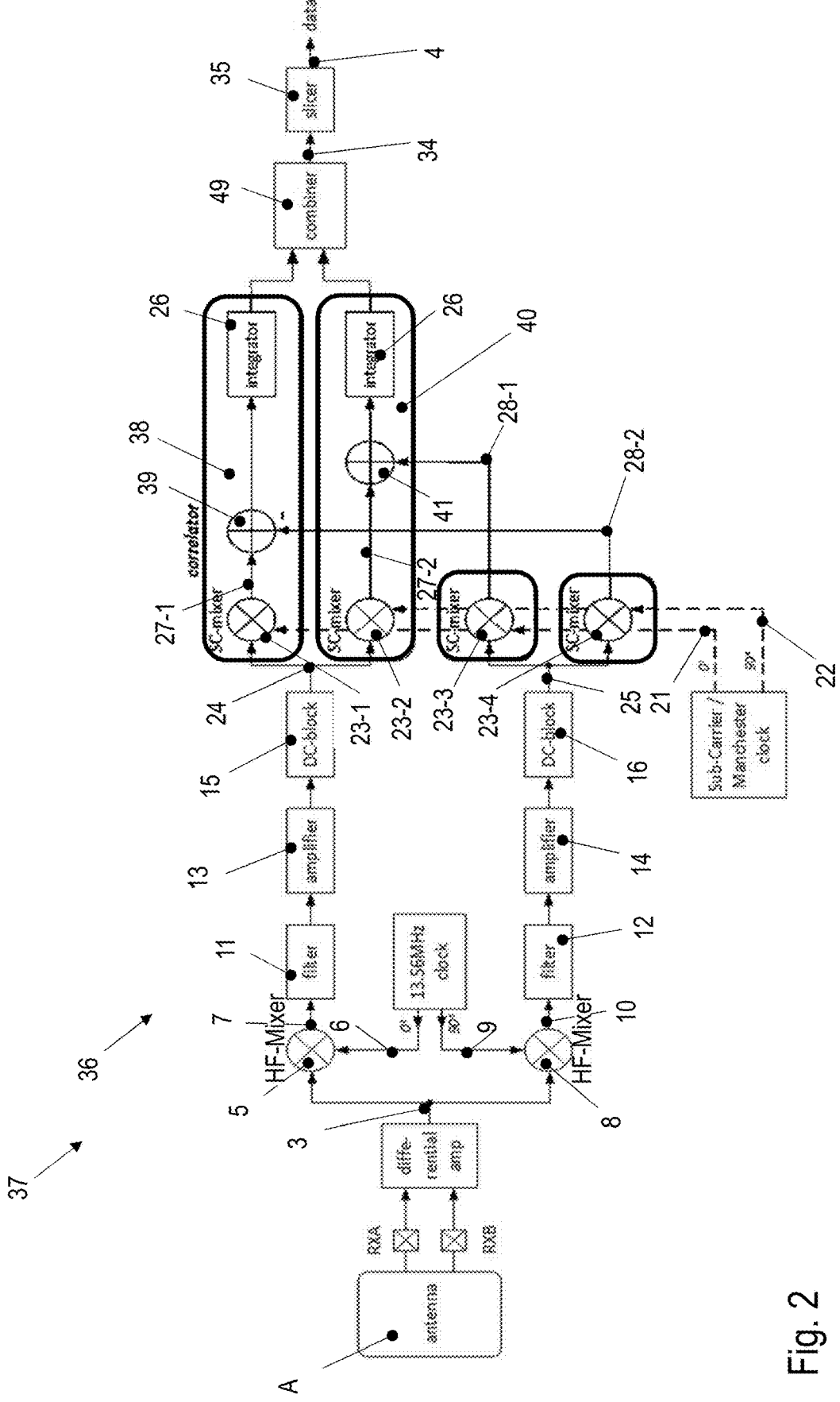
FIG. 2 shows a receiver to process a load modulated analog input signal according to a first embodiment of the invention.

FIG. 2 shows a receiver 36 that is part of an RFID reader 37 that is built to receive a load modulated analog input signal 3 and built to output digital data 4 sent from a transponder or tag to the reader 37 and detected in the input signal 3. Reader 37 according to this first embodiment of the invention communicates with the tag according to the ECMA-340 13.56 MHz Near Field Communication NFC standard, which NFC Standard in-cooperates communication based on ISO/IEC 14.443 Type A and B and Felica, a company standard from company Sony. Reader 37 furthermore comprises a transmitter, not shown in the figures, to emit a magnetic field via antenna A and to transmit data to one or more tags. Such a tag is for instance disclosed in document U.S. Pat. No. 7,890,080 B2.

Figure 1:
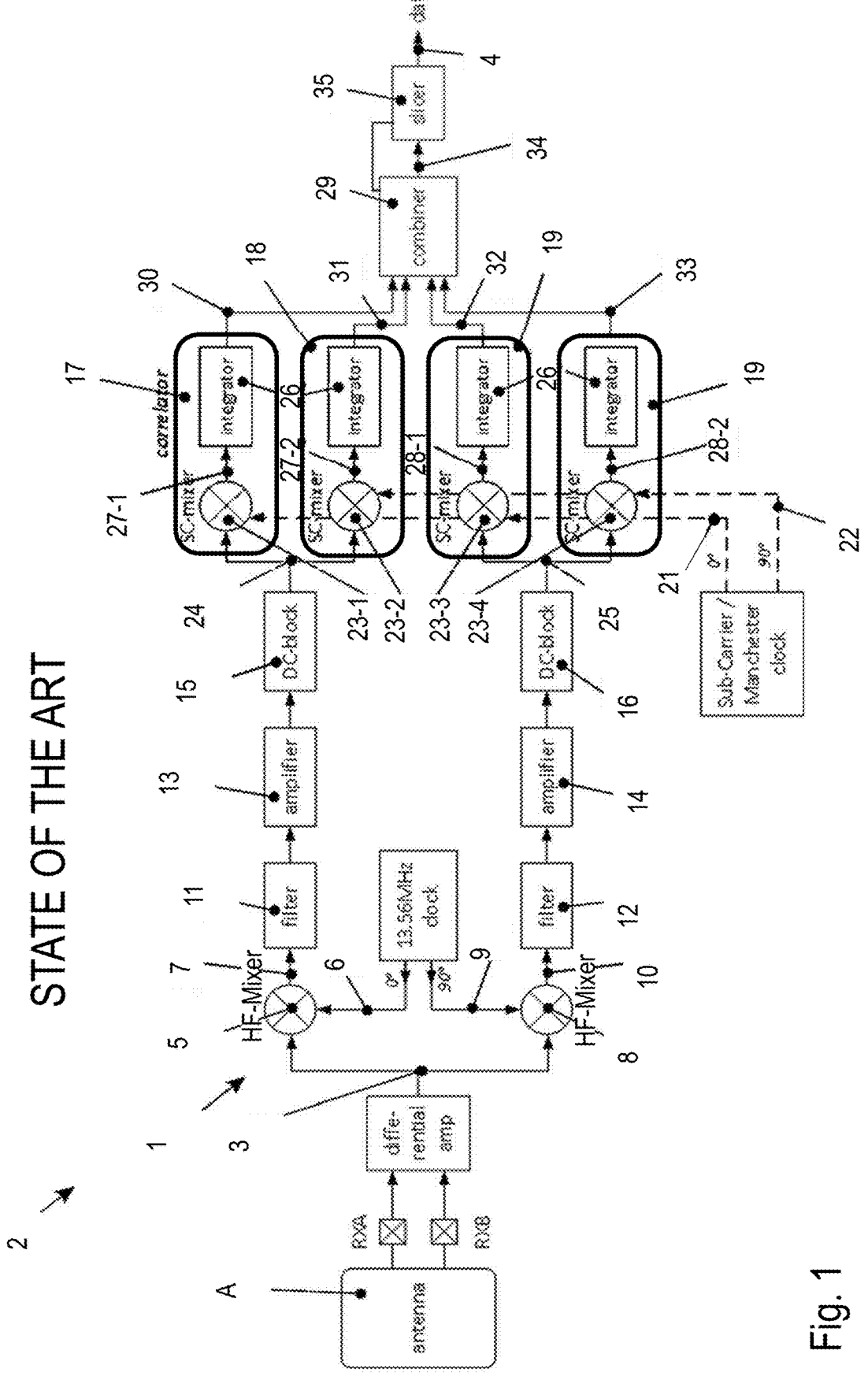
FIG. 1 shows a receiver to process a load modulated analog input signal according to the state of the art.

Most of the blocks of receiver 36 are identical to blocks of the receiver 1 of the state of the art that have already been explained based on FIG. 1 above. Reference is made to this description of FIG. 1, while for FIG. 2 those blocks are described in detail that enable the invention realized with receiver 36. Receiver 36 uses the output signal 27-1 of the first in-phase subcarrier mixer 23-1 and the output signal 27-2 of the and second in-phase subcarrier mixer 23-2 and the output signal 28-1 of the first quadrature-phase subcarrier mixer 23-3 and the output signal 28-2 of the second quadrature-phase subcarrier mixer 23-4 in a different way than receiver 1 of the state of the art does.

Receiver 36 comprises only a the first in-phase correlator 38 and a second in-phase correlator 40 and no quadrature-phase correlators. The first in-phase correlator 38 comprises the first in-phase subcarrier mixer 23-1 and a subtraction stage 39 built to subtract the output signal 28-2 of the second quadrature-phase subcarrier mixer 23-4 from an output signal 27-1 of the first in-phase subcarrier mixer 23-1. The first in-phase correlator 38 furthermore comprises an integrator 26 built to continuously integrate an output signal of the subtraction stage 39 over time during an integration window to provide the output signal of the first in-phase correlator 38.

The second in-phase correlator 40 comprises the second in-phase subcarrier mixer 23-2 and an addition stage 41 built to add the output signal 27-2 of the second in-phase subcarrier mixer 23-2 with an output signal 28-1 of the first quadrature-phase subcarrier mixer 23-2. The second in-phase correlator 40 furthermore comprises an integrator 26 built to continuously integrate an output signal of the addition stage 41 over time during an integration window to provide the output signal of the second in-phase correlator 40.

Combiner 49 is built to add the output signals of the first in-phase correlator 38 and the second in-phase correlator 40. With this addition in the combiner 49 and the definition of $I_{in}$ is the in-phase component 24 and $I_{SC}$ is the in-phase component 21 of the subcarrier and $Q_{in}$ is the quadrature-phase component 25 and $Q_{SC}$ is the quadrature-phase component 22 of the subcarrier, bellow equation of a complex-valued number with a real term and an imaginary term as the result of the multiplication/addition/subtraction is achieved:

$$(I_{in} I_{SC} - Q_{in} Q_{SC}) + i(Q_{in} I_{SC} + I_{in} Q_{SC})$$

As a result of these findings only two of the four integrators 26 of the receiver 1 in FIG. 1 are needed, if output signals of the sub-carrier mixers without integrator are added or subtracted from the output signals of the other sub-carrier mixers as claimed. To realize only two compare to the four integrators of the state of the art reduces the complexity and consumes less chip area. As only the two output signals of the first in-phase correlator 38 and the second in-phase correlator 40 have to be processed in the combiner 49 and the slicer 35, complexity and power consumption is reduced. Quality of the digital data 4 is improved as the amplitude of the only two output signals of the correlators 38 and 40 is higher compared to the amplitude of the four output signals of the correlators 17 to 20. The reason for the increase in amplitude is that the four correlator output signals are combined to two. Specifically, output signal 28-2 is subtracted from output signal 27-1, and output signal 28-1 is added to output signal 27-2. The exact increase in amplitude depends on the phase relation between the input signal 3 and the in-phase component 6 and the quadrature-phase component 9 of the 13.56 MHz clock synchronized to the 13.56 MHz carrier frequency signal, as well as on the phase relation between the in-phase component 24 and the quadrature-phase component 25 and the in-phase component 21 and the quadrature-phase component 22 of the code clock frequency. In the worst case, no improvement is achieved, for example if output signal 27-1 and output signal 28-1 contain all the signal energy. In the typical case however, the signal energy is spread across all four output signals 27-1, 27-2, 28-1 and 28-2 of the sub-carrier mixers 23-1 to 23-4.

Figures 3, 4:
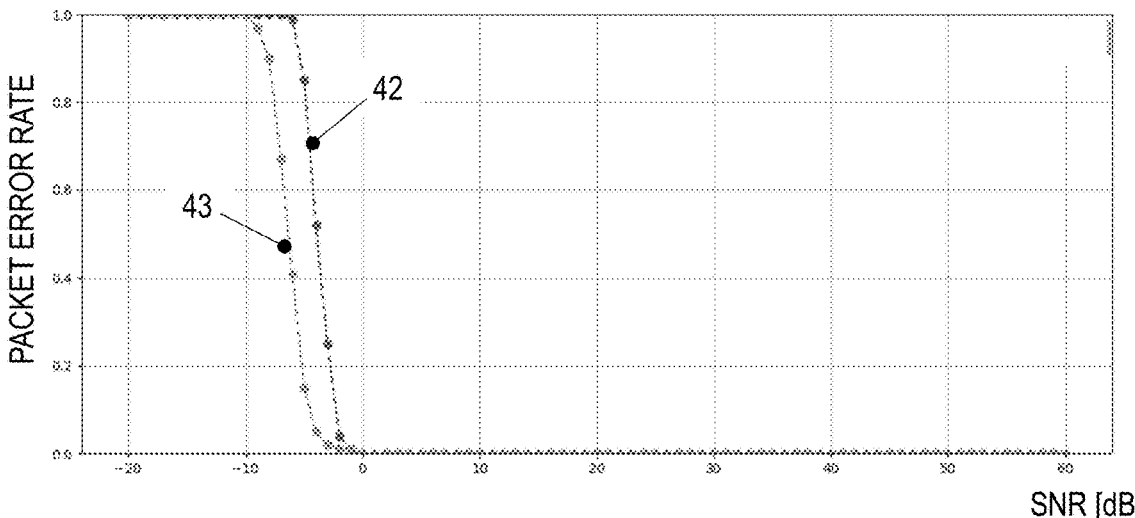
FIG. 3 shows signals of the receivers according to FIGS. 1 and 2 to compare their behavior.
FIG. 4 shows the Packet Error Rate of the receivers according to FIGS. 1 and 2 to compare the quality of digital data received with these receivers.

FIG. 3 shows signals of the receiver 1 of the state of the art according to FIG. 1 and the receiver 36 of FIG. 2 according to the first embodiment of the invention to compare their behavior. FIG. 3A shows the in-phase component 24 of the subcarrier with a frequency of 848 KHz as one example of a noiseless ISO 14.443 Type B frame with a frame size of 1 byte, which is BPSK modulated, in the baseband. FIG. 3B shows the output signal 27-1 of the first in-phase subcarrier mixer 23-1. As the in-phase component 21 of the subcarrier runs at a frequency of 848 kHz, any 848 kHz component in the baseband signals of FIG. 3A ends up at DC (0 Hz). As soon as a 180° phase shift in the baseband signal occurs due to the BPSK modulation, the DC level changes. FIG. 3C shows the four-channel approach according to the state of the art receiver 1 of FIG. 1 with output signal 27-1 of the first in-phase subcarrier mixer 23-1 and the output signal 27-2 of the second in-phase subcarrier mixer 23-2 and the output signal 28-1 of the first quadrature-phase subcarrier mixer 23-3 and the output signal 28-2 of the second quadrature-phase subcarrier mixer 23-4. FIG. 3D shows the two-channel approach of to the receiver 36 according to the first embodiment to the invention in FIG. 2 with output signal 27-1 of the first in-phase subcarrier mixer 23-1 and the output signal 27-2 of the second in-phase subcarrier mixer 23-2. The increase of the amplitude of the output signal 27-1 and 27-2 in FIG. 3D compare to FIG. 3C shows the performance benefit with the two channel-approach, which amount of benefit depends on the phase of the baseband signal as explained above.

FIG. 4 shows a Packet Error Rate of the receiver 1 of the state of the art according to FIG. 1 and of the receiver 36 of the first embodiment of the invention according to FIG. 2 to compare the quality of digital data 4 received with these receivers 1 and 36. Every dot in FIG. 4 represents the ration of "Number of failed Frames"/"Number of total Frames". For a given signal to noise ration SNR [dB], one hundred randomized frames were sent to the receivers 1 and 36 and the result was analysed. If the data were not received correctly, the frame was labeled as failed. FIG. 4 demonstrates that by switching from the known four-channel approach (curve 42) to the inventive two-channel approach (curve 43), by enabling the channel combination of the first in-phase correlator 38 and the second in-phase correlator 40, the performance significantly increases, what means the quality of the digital data 4 received increases.

Figure 5:
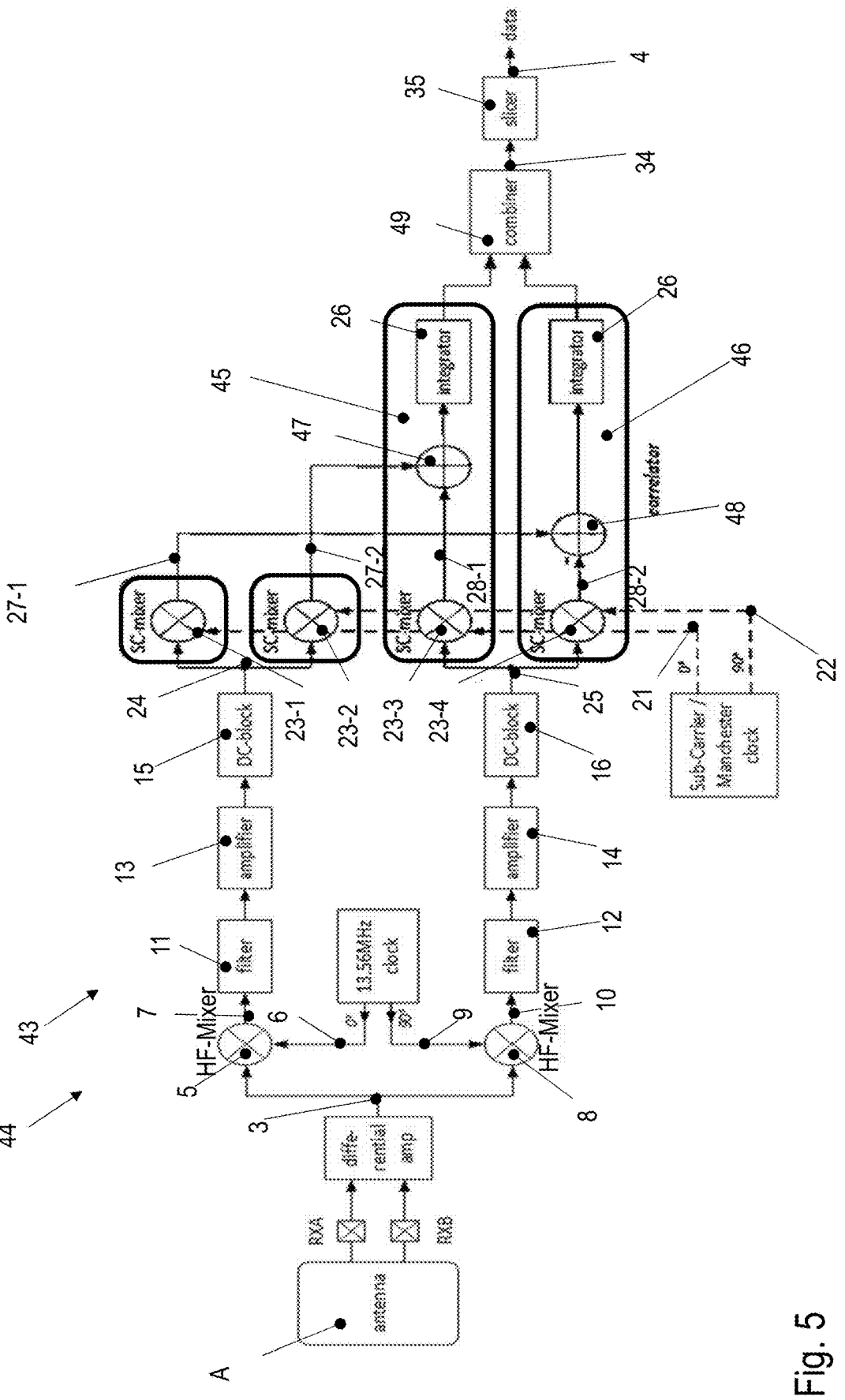
FIG. 5 shows a receiver to process a load modulated analog input signal according to a second embodiment of the invention.

FIG. 5 shows a receiver 43 that is part of an RFID reader 44 that is built to receive the load modulated analog input signal 3 and built to output digital data 4 sent from a transponder or tag to the reader 44 and detected in the input signal 3. Most of the blocks of receiver 43 according to this second embodiment of the invention are identical to those of the receiver 1 of the state of the art that have already been explained based on FIG. 1 above. Reference is made to this description of FIG. 1, while for FIG. 5 those blocks are described in detail that enable the invention of receiver 43. Receiver 43 uses the output signal 27-1 of the first in-phase subcarrier mixer 23-1 and the output signal 27-2 of the second in-phase subcarrier mixer 23-2 and the output signal 28-1 of the first quadrature-phase subcarrier mixer 23-3 and the output signal 28-2 of the second quadrature-phase subcarrier mixer 23-4 in different way than receiver 1 according to the state of the art.

Receiver 43 comprises a the first quadrature-phase correlator 45 and a second quadrature-phase correlator 46. The first quadrature-phase correlator 45 comprises the first quadrature-phase subcarrier mixer 23-3 and an addition stage 47 built to add the output signal 27-2 of the second in-phase subcarrier mixer 23-2 with the output signal 28-1 of the first quadrature-phase subcarrier mixer 23-3. The first quadrature-phase correlator 45 furthermore comprises an integrator 26 built to continuously integrate an output signal of the addition stage 47 over time during an integration window to provide the output signal of the first quadrature-phase correlator 45.

The second quadrature-phase correlator 46 comprises the second quadrature-phase subcarrier mixer 23-4 and a subtraction stage 48 to subtract the output signal 27-1 of the first in-phase subcarrier mixer 23-1 from the output signal 28-2 of the second quadrature-phase subcarrier mixer 23-4. The second quadrature-phase correlator 46 furthermore comprises an integrator 26 built to continuously integrate an output signal of the subtraction stage 48 over time during an integration window to provide the output signal of the second quadrature-phase correlator 46. The same advantages are achieved with the receiver 43 of the second embodiment of the invention as with receiver 36 of the first embodiment of the invention.

As a result, receiver 43 discloses the second embodiment of the invention as claimed. Both, receiver 36 and receiver

43 realize the complex-valued number with a real term and an imaginary term as stated above by use of the two correlators, wherein the signal between the subcarrier mixers 23-1 to 23-4 and the integrators 26 is modified by subtraction stages 39 and 47 and addition stages 41 and 48.

In a further embodiment of the invention the combiner 49 is built to select one of the two output signals of either the first in-phase correlator 38 and the second in-phase correlator 40 or of the first quadrature-phase correlator 45 and the second quadrature-phase correlator 46. This selection of one of the output signals of the integrators 26 is the preferred embodiment for those cases where a BPSK modulation is used, while for amplitude modulation the addition of the two correlator output signals is preferred. In case of the selection of one of the two output signals the slicer 35 is built to use information from the combiner 49 which of the two output signals where selected to select the appropriately aligned bit-clock to sample the output signal 34 of the combiner 49.

In a further embodiment of the invention the combiner 49 is built to interpret one of the output signals of the two correlators 38, 40, 45, 46 as real term of a complex-valued number and the other of the two output signals of the two correlators 38, 40, 45, 46 as imaginary term of the complex-valued number and wherein the combiner 49 is built to calculate and output the absolute value of this complex-valued number based on below formula:

The absolute value (or modulus or magnitude) of a complex number $z = x + yi$ is[11]

$$r = |z| = \sqrt{x^2 + y^2}.$$

and wherein the combiner 49 is built to calculate and output the phase of the complex-valued number based on below formula:

$$\sigma = atan\ 2(Im(z), Re(z)).$$

Combiner 49 may output the absolute value and phase of the complex-valued number. The advantage is that the combiner 49 uses both outputs of the correlators 26 for calculating the magnitude and phase, in contrast to selecting one of the outputs of the correlators 26. As a result, no signal energy is lost by neglecting one of the outputs, and signal quality is increased. The same holds true for adding both outputs of the correlators 26 and can be seen as a simpler alternative to calculating the magnitude.

The invention claimed is:

1. Receiver that is built to receive a load modulated analog input signal and built to output digital data detected in the input signal, which receiver comprises:
   an in-phase carrier mixer built to mix the input signal with an in-phase carrier frequency signal and built to provide an input in-phase component of a down-converted input signal;
   a quadrature-phase carrier mixer built to mix the input signal with a quadrature-phase carrier frequency signal and built to provide an input quadrature-phase component of the down-converted input signal;
   an amplifier built to amplify the input in-phase component and the input quadrature-phase component of the down-converted input signal;
   a DC block filter built to remove a DC component of the input in-phase component and the input quadrature-phase component and built to provide an in-phase component and a quadrature-phase component;

a first in-phase subcarrier mixer built to mix the in-phase component with an in-phase component of a subcarrier or a code clock frequency;

a second in-phase subcarrier mixer built to mix the in-phase component with a quadrature-phase component of the subcarrier or code clock frequency;

a first quadrature-phase subcarrier mixer built to mix the quadrature-phase component with the in-phase component of the subcarrier or code clock frequency;

a second quadrature-phase subcarrier mixer built to mix the quadrature-phase component with the quadrature-phase component of the subcarrier or code clock frequency;

a combiner built to combine output signals of a first in-phase correlator and/or a second in-phase correlator and/or a first quadrature-phase correlator and/or a second quadrature-phase correlator of the receiver;

a slicer built to sample an output signal of the combiner at maximum energy levels to output the digital data detected in the input signal, characterized in that the receiver comprises either the first in-phase correlator and the second in-phase correlator or the first quadrature-phase correlator and the second quadrature-phase correlator, which first in-phase correlator comprises:

the first in-phase subcarrier mixer and a first subtraction stage built to subtract an output signal of the second quadrature-phase subcarrier mixer from an output signal of the first in-phase subcarrier mixer and an integrator built to continuously integrate an output signal of the first subtraction stage over time during an integration window to provide the output signal of the first in-phase correlator;

which second in-phase correlator comprises:

the second in-phase subcarrier mixer and a first addition stage built to add an output signal of the second in-phase subcarrier mixer with an output signal of the first quadrature-phase subcarrier mixer and an integrator built to continuously integrate an output signal of the first addition stage over time during an integration window to provide the output signal of the second in-phase correlator;

which first quadrature-phase correlator comprises:

the first quadrature-phase subcarrier mixer and a second addition stage built to add the output signal of the second in-phase subcarrier mixer with an output signal of the first quadrature-phase subcarrier mixer and an integrator built to continuously integrate an output signal of the second addition stage over time during an integration window to provide the output signal of the first quadrature-phase correlator;

which second quadrature-phase correlator comprises:

the second quadrature-phase subcarrier mixer and a second subtraction stage to subtract the output signal of the first in-phase subcarrier mixer from an output signal of the second quadrature-phase subcarrier mixer; and an integrator built to continuously integrate an output signal of the second subtraction stage over time during an integration window to provide the output signal of the second quadrature-phase correlator.

2. Receiver according to claim 1, wherein a duration of the integration window depends on a modulation type of the load modulated analog input signal and is fixed for modulation types as follows:

ISO14.443 Type A to four sub-carrier periods;

ISO14.443 Type B to eight sub-carrier periods for a data rate of 106 kbit/s;

ISO14.443 Type B to four sub-carrier periods for a data rate of 212 kbit/s;

ISO14.443 Type B to two sub-carrier periods for a data rate of 424 kbit/s;

ISO14.443 Type B to one sub-carrier periods for a data rate of 848 kbit/s; and

Felica to one sub-carrier periods.

3. Receiver according to claim 1, wherein the combiner is built to add two output signals that are either the first in-phase correlator and the second in-phase correlator or of the first quadrature-phase correlator and a second quadrature-phase correlator.

4. Receiver according to claim 1, wherein the combiner is built to select one of two output signals that are either the first in-phase correlator and a second in-phase correlator or of the first quadrature-phase correlator and a second quadrature-phase correlator.

5. Receiver according to claim 4, wherein the slicer is built to use information from the combiner which of the two output signals are selected to select an appropriately aligned bit-clock to sample the output signal of the combiner.

6. Receiver according to claim 1, wherein the first and second in-phase correlators and the first and second quadrature-phase correlators correlate each of the in-phase component and the quadrature-phase component of the load modulated analog input signal with the in-phase component and the quadrature-phase component of the subcarrier or code clock frequency dependent on a modulation type of the load modulated analog input signal, which is fixed for modulation types as follows:

ISO14.443 Type A and B with a square wave that represents the subcarrier frequency; and Felica with a square wave that represents the Manchester clock frequency.

7. Receiver according to claim 1, that comprises a filter to filter unwanted mixing products from the in-phase component and the quadrature-phase component of the down-converted input signal.

8. Receiver according to claim 1, wherein the combiner is built to interpret one of the output signals of the two correlators as real term of a complex-valued number z and the other of two output signals of the two correlators as imaginary term of the complex-valued number z and wherein the combiner is built to calculate and output an absolute value of the complex-valued number z based on a relationship expressed as:

$$r = |z| = \sqrt{x^2 + y^2}.$$

wherein r is one of an absolute value, a modulus and a magnitude of the complex-valued number z, x is a real term of the complex-valued number z and y is an imaginary term of the complex-valued number z;

wherein the combiner is built to calculate and output a phase of the complex-valued number z based on a relationship expressed as:

$$\varphi = \mathrm{atan}\, 2(\mathrm{Im}(z), \mathrm{Re}(z))d$$

wherein Im (z) is the imaginary term y of the complex number z and Re (z) is the real term x of the complex number z.

\* \* \* \* \*